United States Patent [19]

Spath

[11] 3,928,971

[45] Dec. 30, 1975

[54] INTERNAL COMBUSTION ENGINE

[76] Inventor: Tommy W. Spath, Box 13149, Kansas City, Kans. 66113

[22] Filed: Mar. 11, 1974

[21] Appl. No.: 450,051

[52] U.S. Cl. .................... 60/614; 60/280; 60/283; 60/289; 60/315; 60/624; 60/619
[51] Int. Cl.² .......................................... F02G 3/00
[58] Field of Search ............ 60/280, 283, 315, 597, 60/598, 600, 602, 605–609, 613–615, 617–618, 290, 289, 624, 619

[56] References Cited
UNITED STATES PATENTS

| | | | |
|---|---|---|---|
| 2,806,347 | 9/1957 | Pertile | 60/315 X |
| 2,845,774 | 8/1958 | Bertin | 60/619 |
| 2,851,852 | 9/1958 | Cornelius | 60/283 |
| 3,442,077 | 5/1969 | Youhouse | 60/615 |
| 3,498,053 | 3/1970 | Johnston | 60/624 |
| 3,553,961 | 1/1971 | McReynolds | 60/280 |
| 3,775,971 | 12/1973 | Gadefelt | 60/280 X |
| 3,785,152 | 1/1974 | Pozniak et al. | 60/290 |

FOREIGN PATENTS OR APPLICATIONS

| | | | |
|---|---|---|---|
| 944,839 | 4/1949 | France | 60/619 |
| 1,451,911 | 5/1969 | Germany | 60/608 |

Primary Examiner—Charles J. Myhre
Assistant Examiner—James D. Liles
Attorney, Agent, or Firm—John A. Hamilton

[57] ABSTRACT

An internal combustion engine of the usual piston type in combination with a gas turbine operable to assist in powering the output drive shaft of said engine, the exhaust gases and the crankcase vapors of the piston engine, which contain combustible unburned hydrocarbons, being collected, compressed and supplied to the turbine to provide fuel therefor, whereby both to increase the proportion of the available energy extracted from the basic fuel, for greater economy of fuel usage, and also to reduce the amount of atmosphere polluting emissions contained in the ultimate exhaust gases.

3 Claims, 1 Drawing Figure

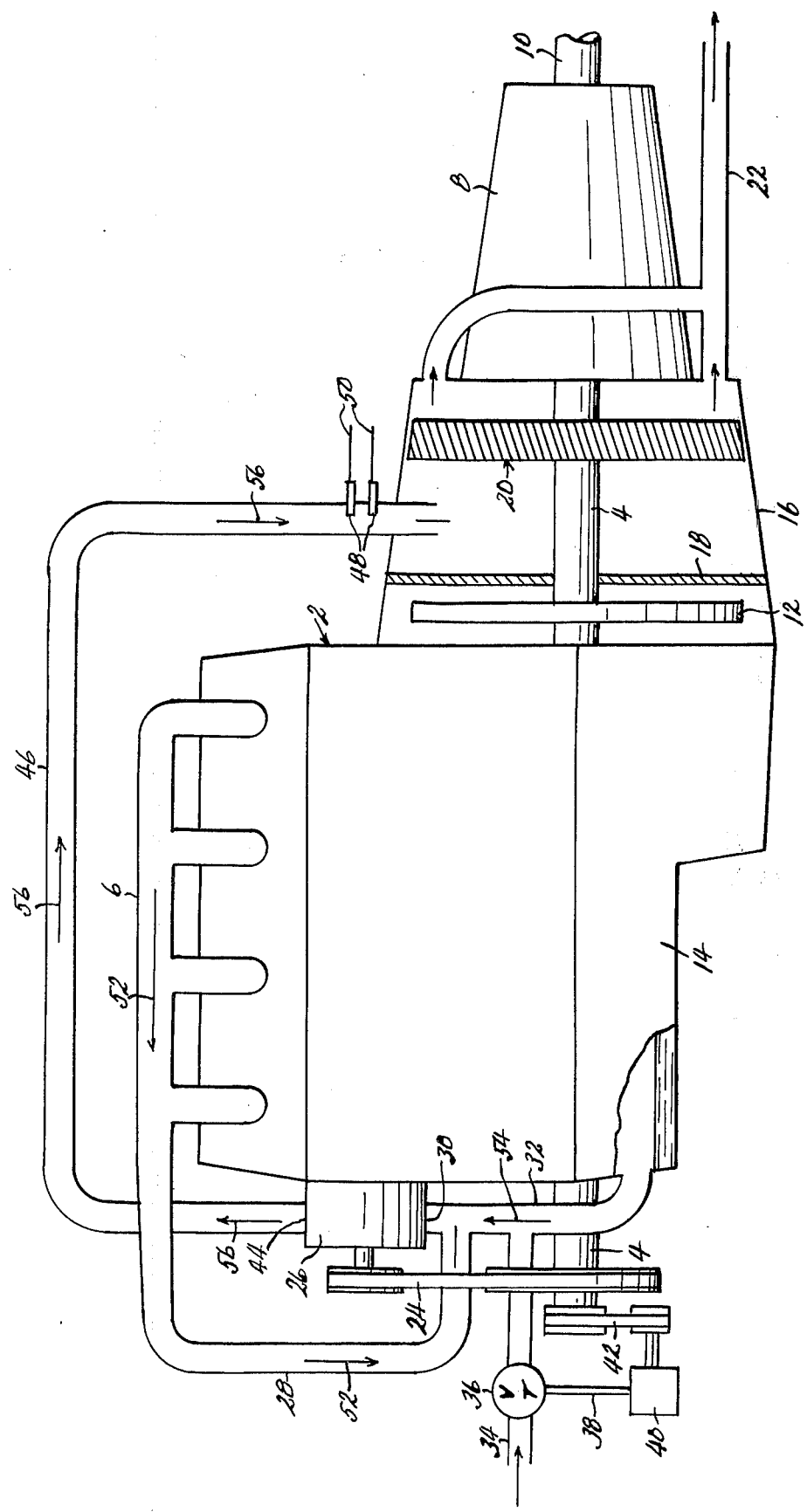

INTERNAL COMBUSTION ENGINE

This invention relates to new and useful improvements in internal combustion engines, and has particular reference to a means providing both for more complete and efficient usage of the basic fuel, such as gasoline or diesel fuel, and also for reducing the degree of atmospheric pollutants contained in the engine exhaust. In view of the present fuel shortage problems, and the likelihood of their continuance, and also in view of ecological concerns, the accomplishment of both of these objects is of the utmost importance. The present engine has been conceived principally as an automobile power plant, but is obviously not limited to this application.

Much work has been done in recent years toward a solution of the problem of atmospheric pollutants contained in the exhaust gases of automobiles, but most of the proposed solutions have centered on the elimination of the emissions at their source, as by the production of fuels, and engines for burning them, which will produce an exhaust gas having a lower atmospheric pollutant content. Efforts along these lines, while producing cleaner exhaust gases, have however been counterproductive in an important aspect in that generally the resultant engines have been low-compression, low efficiency engines making ultimate use of a relatively low percentage of the available energy of the fuel, which is a matter of grave concern in view of persistent shortages of fuel. One proposed and now commonly used expedient, known commonly as positive crankcase ventilation, involves return of crankcase vapors to the carburetor for recycling thereof through the cylinders so that more of the combustible elements thereof will be consumed. However, this expedient is not conducive to good engine efficiency, since it tends to foul the engine with heavy gummy deposits.

Accordingly, the object of the present invention is the provision of an internal combustion engine of the piston type in combination with an auxiliary power unit, which may be a gas turbine, operable to supply additional power to the engine drive shaft, and which in turn is driven by the combustion of exhaust gases of the piston engine, or of the crankcase vapors thereof, or both, it being well known that these gases and vapors contain much combustible but unburned hydrocarbon matter. These gases and vapors are collected, intermixed with a proper proportion of air to support optimum combustion thereof, compressed to a suitable pressure by a compressor driven by the piston engine, and delivered to the turbine housing where they are ignited and burned to produce gas pressure for driving the turbine to supply additional power for turning the drive shaft. The exhaust from the turbine is far cleaner and more free of pollutants than the original exhaust from the piston engine, and additional power has been made available for use.

Other objects are simplicity and economy of construction, and efficiency and dependability of operation.

With the above objects in view, as well as other objects which will appear in the course of the specification, reference will be had to the accompanying drawing, wherein the single view is a diagrammatic representation of an internal combustion engine embodying the present invention.

In the drawing, the numeral 2 applies generally to an automobile engine of the ordinary piston type, which will be understood to include the usual cylinders in which reciprocal pistons are operable by the combustion of an air-gas mixture in said cylinders to produce rotation of a crankshaft 4, all as well understood in the art. The exhaust manifold of the engine is indicated at 6, and it will be understood that crankshaft 4 operates through the usual transmission 8 to turn a drive shaft 10 for delivering power to the vehicle wheels. The engine flywheel 12 is fixed on the crankshaft. The crankcase is indicated at 14.

According to the present invention, a turbine housing 16 is interposed between engine 2 and transmission 8, being sealed from flywheel 12 and engine 2 by partition wall 18, and is traversed by crankshaft 4. Also carried in said housing is a turbine indicated generally at 20, it being understood that said turbine may consist of any desired number of fixed and rotary blades, the rotary blades being affixed to the crankshaft so as to supply rotary power to said shaft responsively to gas pressure in housing 16. At the exhaust side of the turbine, housing 16 is provided with an exhaust pipe 22 open to the atmosphere.

At the forward end of the engine, crankshaft 4 is operably connected, as by a pulley and belt drive 24, to a gas compressor 26, which may be mounted on the engine, whereby said compressor is driven by operation of engine 2. Exhaust manifold 6 is connected by conduit 28 into intake 30 of the compressor, and crankcase 14 is likewise connected into said intake by conduit 32. Also connected into the compressor intake is an air inlet pipe 34 open to the atmosphere but in which is interposed a throttling valve 36 for regulating air flow therethrough. Said throttling valve is controlled by an operative connection 38 thereof to a speed-responsive device 40 which in turn is driven by crankshaft 4 through an operative connection therebetween, such as pulley and belt drive 42. The operation of device 40 is such that the faster crankshaft 4 is turning, the wider valve 36 will open and the more air will be admitted to the compressor. The output 44 of the compressor is connected by conduit 46 into turbine housing 16 ahead of turbine 20, the air-gas mixture thus delivered being ignited continuously just prior to its entry into the turbine housing by any suitable ignition means, such as spark plugs 48 to which electric current from any suitable source is supplied by wires 50.

In operation, presuming that piston engine 2 is functioning in the usual manner to turn crankshaft 4, it will be readily understood that exhaust gases from the engine cylinders flow away from the engine through exhaust manifold 6 as indicated by arrows 52, and that vapors will collect in crankcase 14, these vapors including oil vapor as well as gasoline vapors which may have blown past the pistons, are conducted away from said crankcase by conduit 30, as indicated by arrow 54. All of these gases and vapors, which are known to contain combustible matter capable of producing greatly expanded quantities of gas when burned, and also fresh air admitted by valve 36 in conduit 34, are delivered by conduits 28 and 32 to compressor 26, where their pressure is increased to a level sufficient to force them through conduit 46, as indicated by arrows 56, and into turbine housing 16, said gases being continuously ignited by spark plugs 48. The combustion of said gases and vapors produces large quantities of gas under high pressure which drive turbine 20 to supply added power for turning the crankshaft, and also of course consumes many constituents which would otherwise constitute air pollutants if exhausted to the atmosphere, so that the exhaust through conduit 22 is relatively clean and free of pollutants. Thus my invention provides not only for the removal of air pollutants which often in the past have been exhausted to the atmosphere, thereby providing a cleaner exhaust, but also for the utilization of much of the energy previously exhausted to the atmosphere as waste.

The quantity of exhaust gases and crankcase vapors produced by engine 2, and hence both the speed of operation of compressor 26 necessary to produce the required degree of compression and also the amount of fresh air required to be mixed with said gases and vapors to produce a mixture of optimum combustibility, are of course determined by the speed of operation of engine 2. This variation of both of these factors is provided automatically by the system shown, since both the compressor speed, and the degree to which fresh air valve 36 is opened, is directly proportional to the speed of operation of piston engine 2.

While I have shown and described a generally specific arrangement of the elements constituting my invention, it will be readily apparent that many minor changes of structure and operation could be made without departing from the spirit of the invention.

What I claim as new and desire to protect by Letters Patent is:

1. In combination with an internal combustion engine emitting exhaust gases including combustible constituents and operable to turn a power output shaft:

a. a turbine drivable by gas under pressure and also operable to turn said power output shaft,
   b. means operable to collect said exhaust gases, deliver them to said turbine, and burn them to supply expanded quantities of gas for driving said turbine, said means comprising a gas compressor driven by said internal combustion engine, a conduit connecting the exhaust manifold of said internal combustion engine to the intake of said compressor, means for admitting fresh air to the intake of said compressor, a conduit connecting the outlet of said compressor to the gas inlet of said turbine, and ignition means operable to ignite said air-exhaust gas mixture at the inlet of said turbine, and
   c. a throttling valve operable to regulate the amount of fresh air delivered to said compressor intake, and means responsive to the speed of operation of said engine to adjust said throttling valve, to render the quantity of air admitted directly proportional to the speed of operation of said engine.

2. The combination as recited in claim 1 wherein said compressor is driven by said engine at a speed directly proportional to the speed of operation of said engine.

3. The combination as recited in claim 2 wherein said internal combustion engine is of the piston type including a crankcase in which combustible vapors also collect, and with the addition of means whereby said crankcase vapors are delivered to the intake of said compressor together with said exhaust gases and said fresh air.

* * * * *